Dec. 3, 1957 J. N. SUITER 2,814,901
FISH ATTRACTING DEVICE
Filed Dec. 10, 1954
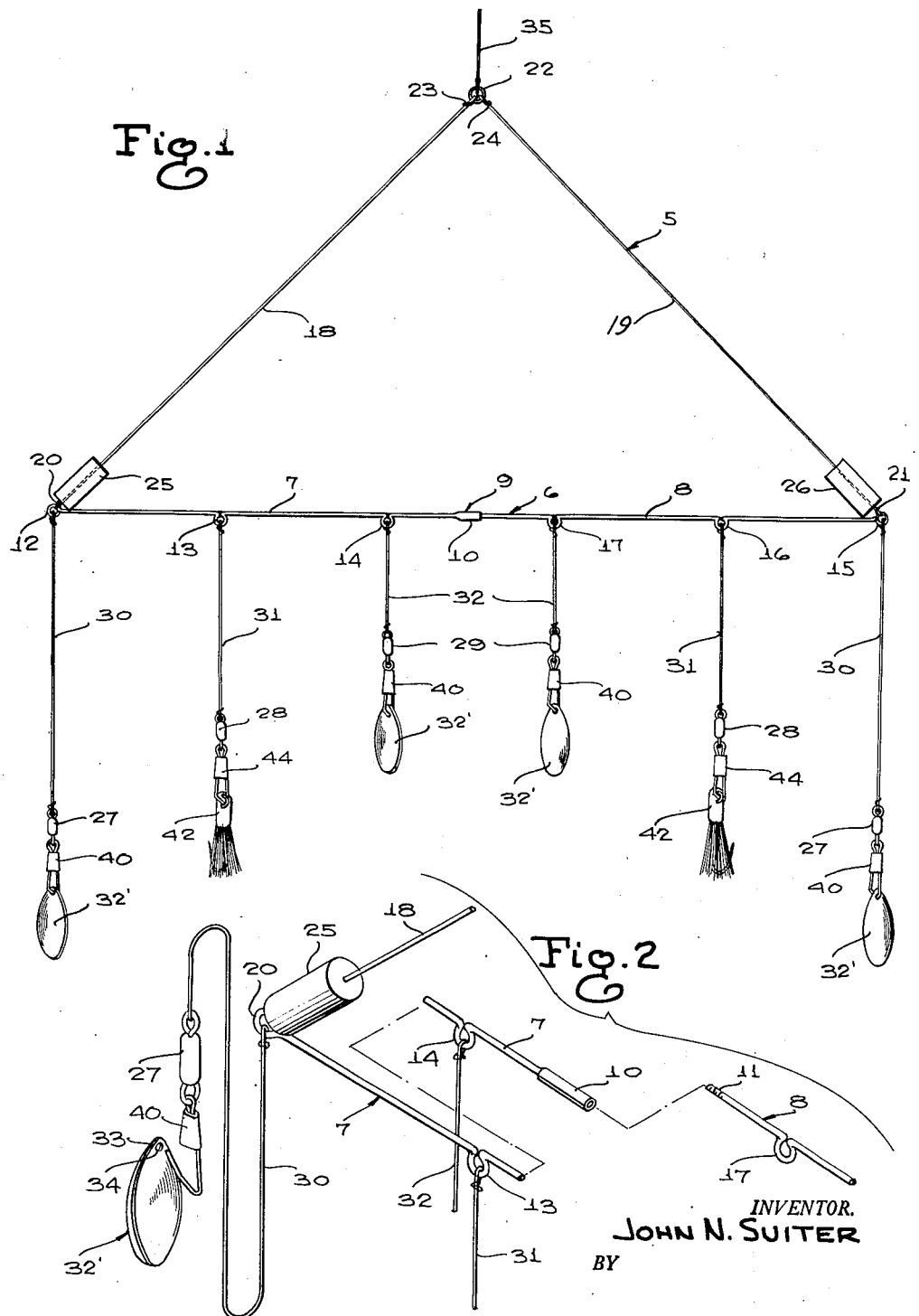
INVENTOR.
JOHN N. SUITER
BY
McMorrow, Berman & Davidson
ATTORNEYS United States Patent Office 2,814,901
Patented Dec. 3, 1957

2,814,901
FISH ATTRACTING DEVICE
John N. Suiter, West Palm Beach, Fla.
Application December 10, 1954, Serial No. 474,396
3 Claims. (Cl. 43—42.74)

This invention relates to a novel device for attracting fish while trolling, the primary object of the invention being to provide efficient and practical means for attracting fish to a moving boat or other trolling device so that a fisherman or fishermen present thereat can fish with the usual tackle with greater assurance of success.

Another important object of the invention is to provide a device of the character indicated above which is simple and rugged in construction, is collapsible, when not in use, into a compact form for storage and transportation in a fisherman's kit or elsewhere, and which is capable of being made in a serviceable and attractive form at relatively low cost.

Other important objects and advantageous features of the invention will be apparent from the following description and the accompanying drawings, wherein, for purposes of illustration rather than limitation, a specific embodiment of the invention is set forth in detail.

In the drawings:

Figure 1 is a side elevation of said embodiment in operative condition; and

Figure 2 is an enlarged fragmentary exploded and schematic perspective view of related portions of said embodiment.

Referring in detail to the drawings, wherein like numerals designate like parts throughout the several views, the numeral 5 generally designates the illustrated fish attracting device, in its assembled or operative condition.

The device 5 comprises a normally horizontal rigid or semi-rigid rod or bar 6, preferably of suitable metal, which is composed of two separable sections 7 and 8, of substantially the same length. The sections 7 and 8 are connectible in axial alignment with each other by a fly-rod joint 9 which involves a socket 10 fixed on the inward end of the section 7 and a plain terminal end 11 on the inward end of the section 8, the terminal 11 being a friction fit in the socket 10.

On the outward end of the section 7 is an outer eye 12, and the section 7 has inwardly of the outer eye 12, an intermediate eye 13, and an inner eye 14, the eyes 12, 13, and 14 being equally spaced from each other, and the inner eye 14 being spaced from the inner end of the joint socket 10 at half the distance between the other eyes. The intermediate and inner eyes 13 and 14, respectively, are preferably constituted by bends in the section 7.

The section 8 has outer, intermediate, and inner eyes 15, 16, and 17, similar to those of the section 7.

Wire strands 18 and 19 have lower ends secured to the outer eyes 12 and 15 of the rod 6, as indicated at 20 and 21, respectively; and upper ends which are secured to a ring 22, as indicated at 23 and 24, respectively. The strands 18 and 19 are of such similar lengths that they are positioned at angles of substantially 45° to the rod 6 when the device is being used.

Free-sliding sinker weights 25 and 26, are circumposed on the wire strands 18 and 19, and normally engage the outer eyes 12 and 15 of the rod 6.

Outer, intermediate, and inner leader wires 30, 30, 31, 31, and 32, 32 are secured to the outer, intermediate, and inner eyes of the sections 7 and 8, and depend therefrom.

Relatively long outer leader wires 30, 30 have secured at their lower ends the outer swivels 27, 27, shorter intermediate leader wires 31, 31 have secured at their lower ends the intermediate swivels 28, 28, and still shorter inner leader wires 32, 32 have secured at their lower ends the inner swivels 29, 29, the lower ends of the lead wires 30, 31 and 32 of each group being along lines generally paralleling the wire strands 18 and 19, respectively.

Secured to the lower end of each of the leader wires 30, 30 and 32, 32 by a swivel clip 40 is a shining spoon 32', which is in the form of a dessert spoon bowl, being elongated in form, with the smaller upper end 33 thereof provided with a hole 34 through which the lower ends of the swivel clips 40 are secured. Similarly, the lower ends of each of the leader wires 31, 31 carry a feather jig 42 including a hook secured by a swivel clip 44. Thus, spoons, feather jigs or lures may be interchangeably employed with the device 5 by merely detaching the spoons, jigs or lures from the associated swivel clips to permit any combination of attachments, in the form of spoon, jigs, lures, etc., as desired.

The device, suspended by the ring 22, on a line 35, is pulled through the water by trolling means, such as a boat. As the device is drawn through the water, the shining spoons 32' and feather jigs or lures revolve on the swivels, and have side to side and darting movements which are attractive to fish and which cause fish to move into the vicinity of the device, where they can be reached with ordinary fishing tackle, or may be caught on the feather jigs or lures carried by the lower ends of the leader wires.

In collapsing the device, the rod sections 7 and 8 are separated and brought up alongside of the strands 18 and 19, with the leader wires 30, 31 and 32 along the rod sections in a compact bundle. The leads are of such length that none of the spoons 32' and feather jigs 42 reach beyond the ring 22. Also, if desired, the spoons and jigs may be detached for purposes of storage.

What is claimed is:

1. In a fishing device, a rod having opposed ends, suspending means secured to said opposed ends, leads spaced along and connected to the rod, said leads comprising relatively long leads depending from said rod at its opposed ends, said long leads being hookless and having spinners thereon, relatively short leads depending from said rod in spaced relation between said long leads, said short leads being hookless and having spinners thereon, and intermediate length leads depending from said rod between the long and short leads, said intermediate length leads having hooks thereon but being devoid of spinners.

2. In a fishing device, a normally horizontal rod, leads secured to and depending from the rod, strands having lower ends secured to the rod at the opposite ends of the rod, said strands having upper ends, means securing said upper ends together and connectible to a fishing line, said strands diverging downwardly with respect to each other, and weights mounted on the strands and resting upon the rod at the opposite ends of the rod.

3. In a fishing device, a normally horizontal rod, leads secured to and depending from the rod, strands having lower ends secured to the rod at the opposite ends of the rod, said strands having upper ends, means securing said upper ends together and connectible to a fishing line, said strands diverging downwardly with respect to each other, and weights mounted on the strands and resting upon the rod at the opposite ends of the rod, said weights being circumposed on the strands and being freely slidable thereon.

References Cited in the file of this patent

UNITED STATES PATENTS

| | | |
|---|---|---|
| 2,077,630 | Lane | Apr. 20, 1937 |
| 2,494,620 | Johnson | Jan. 17, 1950 |
| 2,551,998 | DeGroot | May 8, 1951 |

FOREIGN PATENTS

| | | |
|---|---|---|
| 69,727 | Norway | 1945 |
| 76,474 | Norway | 1951 |
| 481,027 | Great Britain | 1938 |